May 7, 1940.   N. E. OGLESBY   2,199,752
COATED ABRASIVE
Filed Feb. 6, 1937   2 Sheets-Sheet 1
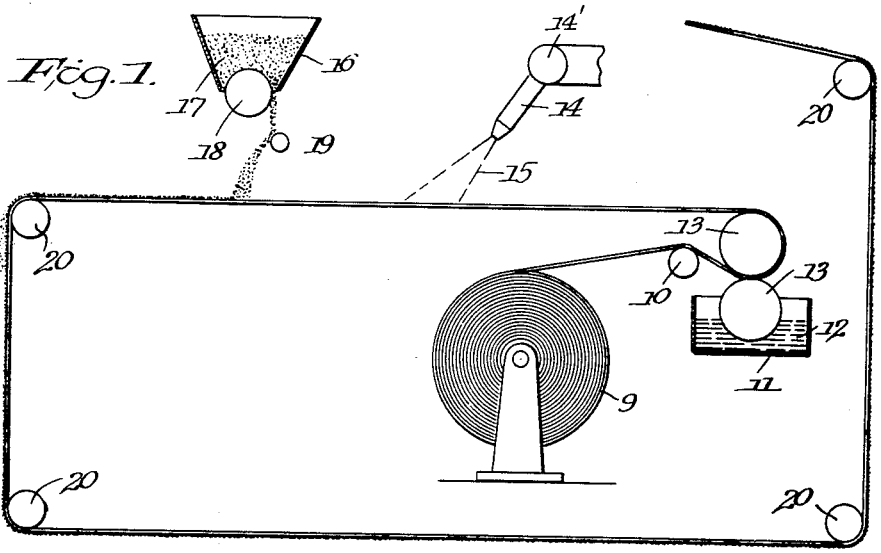
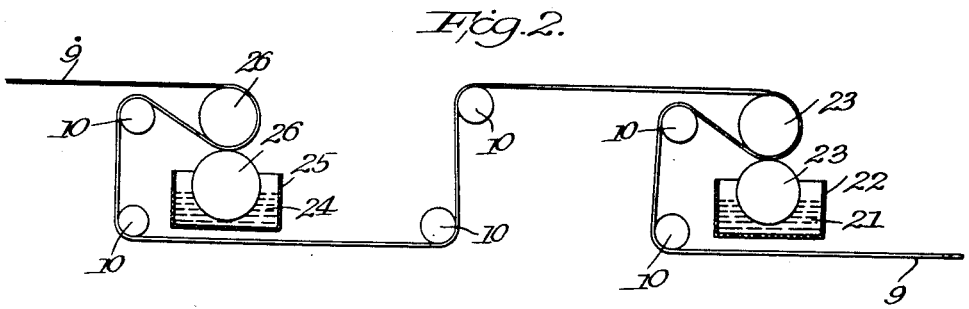
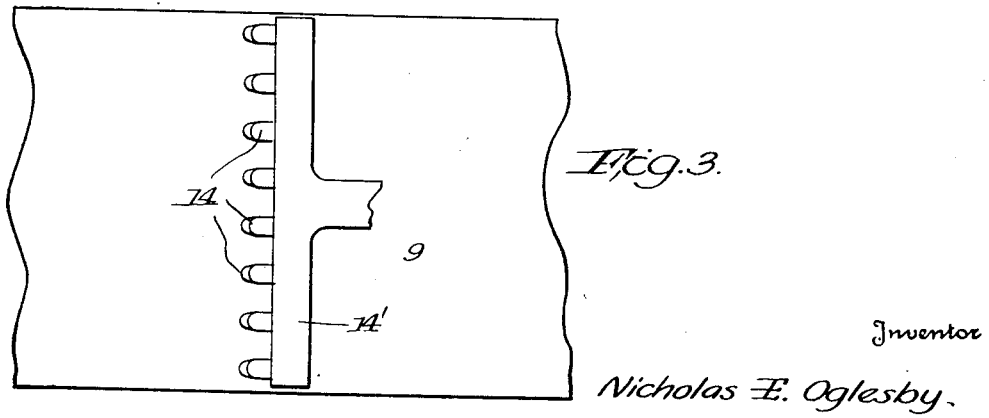
Inventor
Nicholas E. Oglesby
By Cushman Darby & Cushman
Attorney May 7, 1940.  N. E. OGLESBY  2,199,752
COATED ABRASIVE
Filed Feb. 6, 1937   2 Sheets-Sheet 2
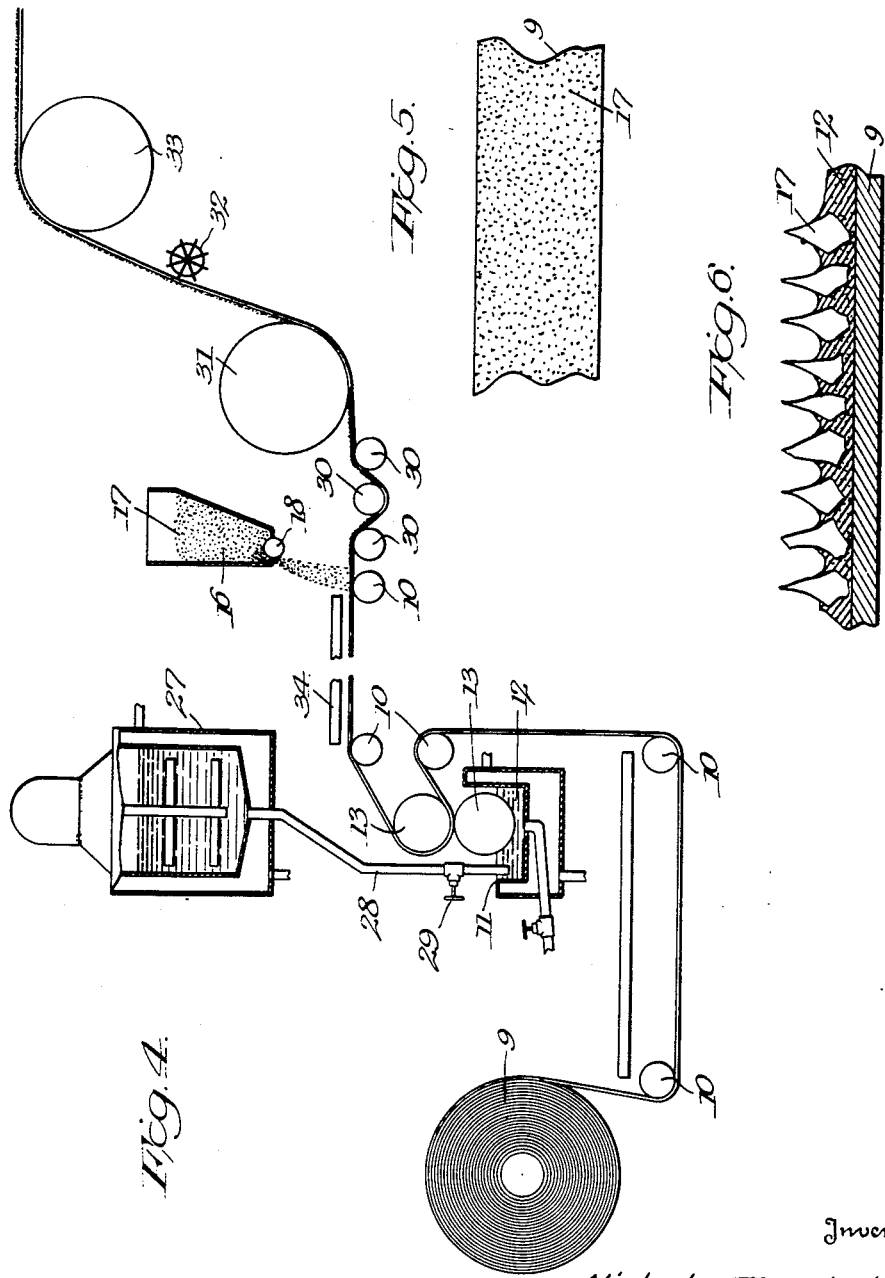

Patented May 7, 1940

2,199,752

UNITED STATES PATENT OFFICE 2,199,752

COATED ABRASIVE

Nicholas E. Oglesby, Troy, N. Y., assignor to Behr-Manning Corporation, Troy, N. Y., a corporation of Massachusetts Application February 6, 1937, Serial No. 124,505

17 Claims. (Cl. 51—278)

This invention relates to coated abrasives and includes an improved product and process of manufacture. Coated abrasives usually comprise a backing of paper, cloth or other suitable support and an abrasive surface of grits, such as emery, alundum, flint, garnet, corundum, silicon carbide, etc., adhesively united to one or both sides thereof. In its broadest aspect this invention comprises using viscous adhesives for binding the grits to the support.

In my copending application Serial No. 124,504, filed Feb. 6, 1937, I have disclosed a method of making coated abrasives in which (1) a viscous resinous adhesive is employed; (2) the viscosity of the resin at the time of and after grit application is critically controlled and (3) the coated abrasive is subjected to critical drying and curing conditions to harden the resin.

While the present invention is directed to a viscous adhesive or bond which may comprise synthetic resins as described in my said copending application, the invention is broadly applicable in connection with various types of binders, e. g., animal glues, and may also be used in those rarer cases where a flexible resinous bond is desired, the maintenance of the grits in their initially applied positions being desirable in the case of a flexible as well as in the case of a relatively inflexible bond. A distinguishing feature of the binders employed is their viscosity and this invention is particularly concerned with a treatment or pre-treatment whereby the surface of the making coat of adhesive is softened or otherwise prepared to receive the abrasive grains, so as to assure that the abrasive grains will be more efficiently wetted, trapped and tenaciously held and supported by the bond in their initially applied positions.

Furthermore, this invention relates to controlling the viscosity and adhesive condition of the resin after formation of the coat upon the backing, up to and including the time of grit deposition so that the surface area of the bond will be highly adhesive and the entire bond will possess the highest possible average viscosity consistent with thorough wetting of the grits.

This invention also bears a direct relation to the critical drying and curing conditions for the adhesive since a higher average viscosity of the making coat is possible by means of the present invention and this in turn permits the use of initially higher drying temperatures, whereby the bond, especially resinous bonds, may be more quickly cured without flow of the coating or material displacement of the grits from their initially applied positions.

The holding of abrasive grains under the severe conditions of usage to which the product is subjected has always been a problem in the coated abrasive art. A thorough wetting of the abrasive grains by the bonding adhesive permits the use of a minimum quantity of adhesive while still insuring sufficiently rigid holding of the grains. A minimum quantity of bonding adhesive is in turn conductive to the exposure of the maximum volume of the abrading grains above the solid adhesive grain layer, thereby producing a free-cutting and long-lasting article. As has been explained in my copending application, Serial No. 124,504, filed Feb. 6, 1937, very efficient coated abrasives are made in which an essential step in the process is the use of highly viscous adhesives for the making coat. I have discovered that in many cases still more efficient coated abrasives may be manufactured where special means are provided to insure a thorough wetting of the abrasive grains by the bonding adhesive.

It is particularly an object of this invention to insure the penetration of the adhesive bond into the crevices of the grains. While this purpose might, to some extent, be accomplished by pre-treating the grains with a relatively non-volatile solvent or a thin form of the resinous adhesive to displace the air from the cracks and crevices and to soften the highly viscous adhesive with which the grains come in contact when coated upon the make coat, it is very difficult and often impossible to properly distribute abrasive grains which have been treated in mass with either a solvent or a thin form of resinous adhesive. The same purpose as well as other advantages are accomplished in the present invention in that the abrasive grains may be positively pre-wetted on the surface which come in contact with the binder by passage through a thin stratum formed with either a solvent, a thin form of liquid resin, or a solution of resin or a mixture of these materials. Furthermore, my complete process provides a means of positively pre-wetting the exposed surfaces of the adhesively held grains prior to the application of the sand sizing adhesive.

The term "treating" or "pre-treating" as used in this specification therefore means, in the manufacture of coated abrasives, the bringing about of conditions in which there is a substantially complete union between a highly viscous resinous bond and the rough irregular surfaces of coated abrasive grains embedded therein, this union generally being accomplished by a temporary reduction in viscosity of the resin immediately adjacent to the abrasive grains during the coating process. Wetting or pre-wetting refers to a treatment or a pre-treatment in which this object is accomplished by the use of a solvent for the adhesive, a thin form of the adhesive or a solution of the adhesive applied over the main body of a very viscous adhesive whereby the surface is rendered adhesive to receive the grains and whereby the grains are pre-wetted in passing through the thin surface film on their way into the viscous adhesive layer.

In the manufacture of coated abrasives in the past the conditions have been such that the top surface of the adhesive layer is more viscous than the main body of the adhesive film at the time of grit application. This condition may be brought about by cooling of the adhesive after its application to the backing and before grit application, the surface of the film cooling more rapidly than the interior thereof, leading to a viscosity differential wherein the surface viscosity is higher than the average viscosity. Such viscosity differential is also frequently brought about by loss of solvent where an adhesive thinned with volatile solvent is used, the solvent escaping more rapidly from the outer seurface of the resin whereby the surface is rendered more viscous than the main body of the adhesive. This condition is undesirable and it is an object of the present invention to overcome such difficulty and bringing about instead thereof, favorable conditions in which the surface of the adhesive is less viscous than the main body of the adhesive coat.

The viscosity, tackiness and softness of the outer surface of the adhesive coat are primarily and most immediately concerned with trapping and wetting of the abrasive grains. It should further be appreciated that the limit of the extent to which the viscosity of the resinous or other adhesive coating can be increased is governed by the ability to trap and hold the required weight of abrasive grains per unit area. It should also be understood that the resinous or other adhesive films with which this invention is concerned are relatively thin and that heat transfer from the interior to the exterior of the film and vice versa is rapid. Since this is true, a quick softening of the outer surface of the adhesive film so as to afford ready wetting and picking up of the abrasive grains permits the use of a resinous film with a higher average viscosity than would be the case if no softening of the exposed surface of the resinous film is accomplished, and hence, there is achieved a picking up of the required coat of abrasive grains and a quick return to a highly viscous condition throughout the layer of adhesive.

Where the term "viscous resin" is used, I refer to the condition of the resin at the time of grit application and immediately thereafter. At the time the resinous adhesive is applied to the backing, it is sufficiently fluid or may be rendered so by use of a resin solvent or by heating as to be spreadable, as for instance, by calender rolls or is otherwise capable of formation on the backing or support as a continuous coat or film of uniform required thickness. It will generally be found economical to apply a viscous coating of resin to the reinforcing backing but the viscosity of the resinous coating may be changed in many ways prior to grit application, provided the resinous film has the required viscosity at the time of and after grit application. Prior to grit application, the resinous film of adhesive on the backing may be increased in viscosity by loss of solvent, by drop in temperature, by further condensation or curing of the resin, or by any combination of these means.

At the time of grit deposition, the resinous film should have the highest possible viscosity consistent with wetting and trapping of the grains as hereinafter explained, and after grit deposition the viscosity of the resinous adhesive should be such that there will be substantially no motion of the grits within the resinous coating or flow of the resinous coating on the supporting backing. As a further means of preventing movement of the applied grains until the viscosity or jelly strength of the resinous adhesive has been increased, the web may be carried substantially horizontally and the viscosity of the resinous adhesive may be increased by a drop in temperature or loss in solvent or a combination of these methods or by other convenient means. The drop in temperature may be brought about by exposure of a film at higher temperatures to lower room temperatures or by positively applied refrigeration.

At the time of grit deposition the resin should have the highest viscosity consistent with picking up the required weight of abrasive grains, but in some cases this viscosity will not be high enough to support the grains in their initially applied positions and it therefore becomes advisable to increase the viscosity to prevent motion of the grains, it being understood that the motion is relatively slow, especially in the horizontal position, thus rendering feasible the freezing of favorable orientation of grains before there has been any material movement of the grains from their initially applied positions.

Once the viscosity of the resinous adhesive is at or above a critical point, i. e., at or above a point high enough to prevent flow of the resinous coating and motion of the grains within the resinous coating, the coated web may be changed in direction and moved into the curing room, festooned and cured in any way as desired so long as conditions are not brought about which would bring the viscosity of the resin below this critical value. The initial curing conditions are therefore intimately connected with and dependent upon the viscosity of the resinous film. The initial curing conditions must be such that the viscosity of the resin will not be lowered below the critical point required to maintain the grains in substantially their original positions. The greater the viscosity of the resinous film the higher may be the initial curing temperature and it becomes a problem of the first importance to coat abrasive grains to an adhesive film of such a high viscosity that the abrasive grains can be supported at a temperature high enough to produce a commercially feasible rate of cure of the resin. Methods by which this problem is solved will be clear from the detailed illustrations of the manufacture of coated abrasives as given hereafter.

The process will be generally understood from the preceding description and my said copending application. As stated, the process of this invention embraces a positive step and means of preparing the top zone of the binding layer so that the bond has at the time of grit application, the highest possible average viscosity and a surface adapted to receive the abrasive grains, thus permitting the picking up of the required coat of abrasive grains, thorough wetting of their surfaces, and permeating of their crevices while at the same time insuring their penetration into and embedding by the more viscous adhesive strata beneath the surface, whereby the abrasive particles are held in a favorable position and undesirable bunching, clumping or motion of the grains is prevented. This step of softening the surface layer of the adhesive coat or of pre-wetting of the abrasive grains as well as the surface coat of the adhesive or a combination of these methods, comprises subjecting the resin (a) to the action of a resin solvent of such character and in such quantity for a sufficient period of time to soften the outside surface or top zone of the making coat in accordance with the nature of the resin being used and the size of the grit being coated and in accordance with whether it is desired primarily to soften the outside surface of the resinous coating or pre-wet the abrasive grains so that they will carry with them in their penetration of the resinous adhesive, a thin film of the pre-wetting agent, or (b) to the action of a resin in a more fluid condition than the main resin film or a solution of a viscous resin thinned with a resin solvent at such temperature and concentration and in such an amount as is required to accomplish the aforesaid purpose of reducing the hardness of the outside surface to the point where the resin has proper qualities for wetting and anchoring the grains. As a further alternative (c), I apply radiant heat to the outside surface at such temperatures and for such a time period as to accomplish the desired result. There are instances where I may use the solvent step or the step of applying a fluid resin or a thin resin solution, followed by the heating step, or vice versa, but in case a solvent is used or a resin solution containing a solvent is used, followed by a heat treatment, the solvent should be slowly volatile so as to avoid case hardening of the outer surface due to too rapid loss of solvent under the influence of heat It is to be understood that by each treating, pre-treating, wetting step or any combination thereof, the outer surface or top zone of the bottom coat is softened to an extent which is relatively thin or film-like, compared to the main body of the bond, i. e., there is obtained in effect a stratification with the outer layer of less viscosity than the main body of the bond.

At the time of grit application the adhesive making coat has the highest average viscosity consistent with adhesiveness of the outside layer required to trap and thoroughly wet the abrasive grains, thus insuring that the bottom portions of the abrasive grains will penetrate into and be supported by the most viscous bond which the particular grit is capable of penetrating, i. e., this is possible because of the gradual increase in viscosity of the resinous film around the bottoms of the abrasive particles as these particles penetrate the film. This practice is conducive to thorough wetting of the abrasive grains which insures that the grains in the finally cured product will be tenaciously held while at the same time supporting the grains in their initially applied positions throughout subsequent processing.

Also, in some cases the initially applied adhesive film may be treated, as by heating, to further condense the resin and increase the average viscosity of the resinous film, and this step may be carried further than would otherwise be the case if a solvent treatment or other stratifying operation as described herein were not carried out to soften the surface of the resinous film before grit application.

It is a further object of this invention to provide a means of applying a sizing adhesive over the tops of the abrasive grains in such a way as to obtain the maximum grit-holding power with a minimum of sizing adhesive, this object being accomplished by more thorough wetting of the abrasive grains than would otherwise occur. The abrasively coated product made by this invention, my said copending application or by a combination of the two, may be sized in the usual manner but in some cases where it is desired to tenaciously hold the abrasive grains in the final product with a minimum of binder, the following procedure may be carried out in which one or more sizing coats are applied.

In certain cases after the grains have been applied to the making coat of adhesive and this making coat of adhesive preferably has been partially or wholly cured or otherwise rendered relatively hard, I find it desirable before adding a regular sizing coat or coats, to pre-wet the exposed portions of the abrasive grains and the surface of the making coat of adhesive with a resin solvent or very fluid form of resin such as one in an early stage of the condensation reaction or a solution of a more viscous resin in an amount and under such conditions as will permit thorough wetting of the surface of the grains and penetration of the crevices. This promotes a more thorough final union between the surface of the abrasive grains adjacent to the sizing coat and the sizing coat of resin, and also promotes a more thorough union of the making and sizing coats by means which, to some extent, depend upon the condition of the making coat, but in any case, tends to overcome formation of air pockets, bubbles, or otherwise void spaces which would prevent contact between the making and sizing coats of adhesive. Instead of applying one sizing coat after the pre-treating step in the usual way, two or more sizing coats may be applied with the desired degree of curing, or no curing in some cases between the sizing steps. After the sizing operation or operations, the resin is cured as heretofore explained under such conditions as will prevent flow of the resinous coating or dislocation of the grain.

While usually not as economical because of the time required for partial curing of the individual sizing coats, very efficient bonding of abrasive grains previously anchored in a making coat may be accomplished after partially or wholly curing the making coat by applying successive sizing coats in which a very thin film of a fluid resin is applied to the abrasive grains, the quantity of resin added to the grains in any one operation being adjusted to prevent flow of the low viscosity resin, partially curing or completely curing this sizing coat and then adding a second sizing coat of the thin resin in the same way and repeating the operation until the required quantity of resinous size has been added. Usually two or not to exceed three coats will suffice.

Where glutinous adhesives are used, I prefer to use what is known to the trade as hide glues and I prefer to use a glue which has a standard viscosity test of at least 86 milliposes and a jelly strength test of at least 256 grams. Hide glues with higher viscosities and higher jelly strength tests are often preferred.

The terms "viscous" and "viscosity" are used in this specification to denote a property of an adhesive which resists flow. It is recognized that my process involves at different stages, matter in a state of viscous flow, matter in a state of plastic flow and matter in a state without flow. For the purpose of this specification a resin may be so viscous or have so high a viscosity that it has an infinitesimal rate of flow or even no flow, and a viscous adhesive may be a liquid, a jelly or a solid which will be considered as matter of different degrees of viscosity. It should be appreciated that the present specification deals particularly with films of adhesive as used in coated abrasives and that the flow characteristics of the resin are dependent upon the film thickness as well as the viscosity of the adhesive. Furthermore, the flow characteristics of the film are influenced by the adhesive forces between the backing and the adhesive on the one hand, and between the grains and the adhesive on the other hand. Flow characteristics also depend to some extent upon the surface tension of the film. In the use of any specific adhesive, the viscosity is adjusted to obtain the final desired flow characteristics of the resin and limited motion of the grains within the adhesive, irrespective of other influences which are properties of the specific adhesive used, the backing used and the abrasive grains used. This means that in any case after grit application, the viscosity of the particular adhesive used should under the conditions of processing be great enough to prevent substantial flow of the adhesive coating or substantial dislocation of the grits from their initially applied positions.

Where synthetic resins are used, I prefer to employ viscous resins of which the following examples will serve as illustrations:

Resin Example I

A suitable viscous resinous adhesive for coating of the paper, cloth or other backing, is prepared as follows:

Heat together to 100–110° C. while stirring—

| | Parts by weight |
|---|---|
| Phenol | 100 |
| NaOH (solid) | .86 | and hold at 100–110° C. for 15 min. to dissolve NaOH. Cool to 50° C. and add slowly while stirring:

| | |
|---|---|
| Paraformaldehyde | 30 |

While stirring raise temperature slowly over about 70–75 min. to about 120° C. and hold at 100–120° C. for about ½ hr. or until cooled sample is of desired viscosity. Do not allow to boil or reaction will become violent and uncontrollable.

Resin Example II

A satisfactory method of preparing a resin with a lower viscosity than Example I is as follows:

Heat together to 100–110° C. while stirring—

| | Parts by weight |
|---|---|
| Phenol | 100 |
| NaOH (solid) | .86 | and hold at 100–110° C. for 15 min. to dissolve NaOH. Cool to 50° C. and add slowly while stirring:

| | |
|---|---|
| Paraformaldehyde | 30 |

Apply a slight vacuum (about ½" to 1") and raise temp. slowly over 1–1¼ hrs. to 100° C. Raise vacuum to 10–15" till temp. is about 70° C. Hold at this temp. under vacuum till cooled sample shows desired viscosity. Then cool to 35° C.

This more fluid form of phenol aldehyde resin is suitable for blending with the resin prepared in Example I, to give a variety of viscosities such as is required for the different grit sizes.

Resin Example III

In case a more flexible phenolic resin is required, the following will serve as an illustration:

| | Parts |
|---|---|
| Phenol | 100 |
| Tung oil | 120 |
| Phosphoric acid | 1 |

Heat 5 hours at 180° C. To this is added 7 parts hexamethylene tetramine and the mixture is then heated to evolution of ammonia. 125 parts turpentine or other solvent are added and 7 parts additional hexamethylene tetramine are added and this mixture is then heated just to solution to give a solution of a potentially heat reactive resin of the semi-flexible type.

The heating of this resin may be regulated to give different degrees of viscosity to the resins or different viscosities may be prepared and blended to give a variety of viscosities.

Resin Example IV

Where it is desired to prepare a phenolic resin which may be used in the form of a solution to make certain coated abrasives in accordance with this invention, the following will serve as an example:

Mix—

| | Parts by weight |
|---|---|
| Phenol | 100 |
| Formalin | 187 |
| Ba(OH) | 6 | and heat for 4 hrs. @ 60–65° C. Apply 25–28" vacuum and heat to 110° C. Hold under vacuum at this temperature until drop in ice water is brittle. Add:

| | |
|---|---|
| Alcohol (denatured) | 40 | to dissolve and cool. If a lower viscosity is desired, more solvent may be added or conversely less solvent may be used for higher viscosities.

The resin itself when made in accordance with Resin Example IV if substantially completely dehydrated is a solid at ordinary temperatures. Furthermore, a resin made in accordance with Resin Example I if substantially completely dehydrated is a solid or tough jelly at ordinary temperatures. Although used with a solvent, the resin of Resin Example IV is remarkably free of penetration into the base at coating concentrations and, therefore, when this resin is used, there is no objectionable brittlizing due to impregnation. Likewise, other resinous adhesives used by way of illustration are relatively free of objectionable penetration into the paper backings.

Resin Example V

For preparing a relatively fluid softening coating of resinous material to be used in connection with a viscous resin such as Resin Examples I or IV, I preferably use the early stages of a phenol aldehyde type resin prepared by heating gently to solution at 100°, phenol 94 parts, paraform 30 parts and 28% ammonia 1 part, and then cooling the solution. This material may be used either with or without a resin solvent as mentioned above, depending upon the grit size and the temperature of application. The finer grits require the thinner solutions.

In lieu of a very fluid resin or a fluid type resin thinned with a solvent as hereinbefore mentioned, either of the aforementioned viscous resinous coatings may be diluted with a resin solvent to produce a dilute 5 to 20% solution of the viscous adhesive which may be used as the wetting agent.

Suitable solvents for the wetting or pre-wetting step in accordance with this invention, are selected in accordance with their solvent effect on the adhesive used and the volatility required in a particular case. In the case of the phenol formaldehyde or phenol hexamethylene tetramine condensation products, I may use furfural, ethyl alcohol or acetone.

While the resin examples given by way of illustration are essentially phenolic resins or modified phenolic resins, I may also use suitable alkyd resins or urea-formaldehyde resins. I may also use phenol formaldehyde resins suitably modified with vinyl resins such as the vinyl chloride and vinyl acetate resins. I may also use vinyl resins prepared in accordance with the patent to Morrison et al., No. 2,036,092.

In most cases, I use the same resins or similar resins for the making adhesive coat and the sand sizing adhesive coat. Where different or dissimilar resins enter into the structure as, for instance, as making coat adhesives, as pre-wetting or treating liquids and as sand sizing adhesives, these materials should be used with due regard to their compatibility. By this I mean that the resins should be of such a nature that in the finally cured structure there will be a firm union as, for instance, between the making and sizing coats of adhesive. Where a non-volatile pre-treating liquid such as a thin resin is used, the pre-treating liquid should in the same way be compatible with the making and sizing adhesives.

An important part of this invention consists of the use of certain resinous adhesives disclosed herein and those disclosed in the aforesaid copending application in which it is explained that the resinous adhesive is developed to have a high tensile strength, resistance to heat, resistance to moisture and resistance to a combination of heat and moisture. Furthermore, the said resinous bond is characterized by hardness, rigidity and toughness, but is relatively inflexible as compared with bonds used in the product known to the trade as "waterproof sandpaper." The tensile strength of the finally cured aforesaid resinous adhesives may be varied by their components but in general the adhesive bond for this form of my coated abrasives has a tensile strength in excess of 6000 lbs. per square inch, usually about 8000 to 14000 lbs. per square inch or higher, and an elongation at rupture of about 2 to 4%, such tensile strength and elongation values representing an advanced stage of cure, with the resinous adhesives used by way of illustration. It should be understood that while the tensile strength values given herein are measured at 70° F. and 50% relative humidity, these values are not materially altered by practical humidity changes or most temperature changes encountered in use, as for instance, temperatures which may approach 500° F.

By tensile strength, I mean the strength of a corresponding film of the adhesive cured in the same manner but without abrasive grains.

The development of the high tensile strength and other desirable properties in the aforesaid class of resinous binders such as for example the phenol aldehyde resins, is preferably accomplished by final curing at a relatively high temperature, as for instance, 140-150° C., but the final use of this high curing temperature presupposes the use of a critically controlled curing cycle in which the curing process is started at a relatively low temperature, as for instance, about 100° or 110° F., the temperature being progressively increased in such a way that the viscosity of the adhesive is never allowed to drop below a critical value required to prevent substantial displacement of the grits from their initial positions. In other words, the decrease in viscosity brought about by increasing the temperature must be at a rate equal to or less than the increase in viscosity due to the resin condensing reaction or the loss of solvent, or both.

My process of treating or pre-treating the adhesive film applied to a reinforcing backing and of treating or pre-treating the surfaces of abrasive grains is applicable to viscous adhesives in general. It is particularly advantageous when used in connection with strong, tough but relatively inflexible adhesives having high tensile strength such as those illustrated by Resin Examples I, II and IV. It may also be used with resins which have less tensile strength, but are inherently flexible such as Resin Example III.

It should be appreciated that coated abrasives are often referred to as flexible sheet abrasives. In the case of coated abrasives in which flexibility is imparted to the product by the inherent flexibility of the binder, mechanical flexing is usually not practiced. In the case of conventional coated abrasives made with glutinous binders, it has been the custom to impart flexibility to the coated sheet by a mechanical breaking of the adhesive abrasive coat. The requirements of flexibility are different for different classes of products and the breaking of the adhesive-abrasive coat has been regulated in accordance with the intended use of the product. Several methods are known in the coated abrasive art for mechanical flexing of sheets made with a relatively inflexible binder such as glue. In one method of flexing, the web is pulled under tension over a bar with its back against the bar edge, the width of the edge of the bar being varied according to the distance desired between breaks. The narrower edged bars give the closer breaks. Sometimes the web is pulled over a bar in such a way as to produce breaks which are substantially perpendicular to the length direction of the coated web, while in other cases the breaks are at about an angle of 45° to the length direction of the coated web.

Another method of mechanical flexing of coated abrasives consists in pulling the coated web between a rubber roll and a small steel roller to which pressure is applied to push the web into the rubber and form regular breaks in the adhesive-abrasive coating.

Whereas, in the present invention, an adhesive is used which has a high tensile strength as, for instance, 6,000 to 14,000 lbs. per square inch or more, the bond is relatively tough, and it is sufficiently inflexible and brittle, that is, of a nature to permit mechanical flexing without material injury to the union between the grits and the adhesive or the union between the adhesive and the reinforcing backing.

A critical drying cycle, such as is required in my process, extends over a relatively long period of time, and may include a number of different temperatures. Over such a period of time a relatively slow flow of coating or a slow motion of grains within the coating may permit displacement of the adhesive coating or of the abrasive grains within the coating and such flow or dislocation of grains may not be readily detectable during a short period of time, with the result that the product may be damaged materially before such a slow process of damage becomes evident and can be corrected. Where the product is damaged by such a slow process, such damage results from the existence of conditions wherein the viscosity of the adhesive is too low. Since the drying cycle is critical, I find it desirable to apply a test to determine the critical viscosity of the adhesive bond during the process of curing especially where such data is not available from previous runs with the same adhesive under identical or less favorable conditions. The product is delivered to the initial drying conditions as herein described without any visible substantial flow of adhesive or dislocation of the grits from their initially applied positions, and the initial drying conditions are so adjusted that the average motion of the grains from the tops of a vertical web towards the bottom will not exceed six one hundredths of an inch in 15 minutes. It has been determined experimentally that at a given set of conditions, that is as for example, at constant temperature and humidity, the greater part of the flow of the coating towards the bottoms of the loops and loss of orientation due to the grains turning over, occurs within the first 15 minutes. It has further been determined, that an average motion of grains from the tops towards the bottoms of the festoons of not to exceed six one hundredths of an inch in 15 minutes, insures the maintenance of a large part of the initially attained orientation of grains.

It should be appreciated that it is desirable to keep the loss of orientation and the flow of the coating at a minimum and that in general in the practice of my invention the average motion of the grains may be considerably less than six one hundredths of an inch for the first 15 minutes. Since, however, it is desirable, for reasons of economy, to cure the coated abrasive as rapidly as possible, it sometimes becomes advisable to compromise between the rate of flow permitted and the rate of curing found commercially economical.

So long as the temperature is not higher than can be endured by the operator, the motion of grains from the tops towards the bottoms of the festoons and the loss of orientation may be conveniently determined with suitable supports, a suitable microscope, suitable illumination and a fixed reference scale, both the scale and the grains being observed through the microscope. Many methods of making the required measurements will occur to those skilled in the art. In case the temperature is above that which can be endured by the operator, an electric oven equipped with a clear glass front and with a temperature control may be conveniently used. By use of a suitable microscope, scale and proper illumination, the sample may be viewed through the front glass of the oven. A sizable sample as for instance, 5" x 3", is placed in the oven as by hanging from a support so that the abrasive adhesive coating is visible through the glass front of the oven. Attention is fixed upon a few representative grains within the field of vision, and during a 15 minute period of observation there should be no material loss of orientation and the average motion of the grains towards the bottom of the sample should not exceed six one hundredths of an inch.

For the initial test to determine possible loss of orientation or flow of the coating, any reasonable but constant conditions may be taken. If the flow of the coating during the test period is too great, conditions should be brought about which will increase the viscosity of the adhesive coating. If there is little or no motion, conditions may be brought about which would decrease the viscosity of the adhesive, as for instance, an increase in temperature which would increase the rate of cure of the resin. By the use of this test it is possible to determine the conditions of cure that may be permitted without substantial loss of orientation or dislocation of the grains from their initially applied positions, as for instance, because of flow of the adhesive coating over the backing which may sometimes occur in case of surface hardening of the adhesive even though there is not an excessive loss or orientation. After the correct initial drying conditions are determined, these conditions may be maintained for any desired period of time without material flow of the adhesive or loss or orientation of the grains. The rate of cure depends upon the resinous adhesive used and the initial temperature which it has been found feasible to use. After partial curing at the initial conditions, it is usually desirable to increase the temperature to increase the rate of cure. Before raising the curing temperature or otherwise bringing about conditions that might lower the viscosity of the adhesive, a test to determine the extent of flow or loss of orientation at the new conditions should be applied. It should be appreciated that repeated increases in temperature with a flow of somewhat less than six one hundredths of an inch would eventually damage the coating to a material degree. For reasons of economy it is usually advisable to use the highest temperature possible for the initial curing conditions and then raise the temperature gradually so that the flow of the resin and loss or orientation will be negligible with succeeding increments of temperature. In running a test to determine the temperature increment that is permissible without injury to the coating, it is advisable to keep the average motion of the grains from the tops towards the bottoms of the festoons at a rate of not to exceed one one hundredth of an inch for the first 15 minute interval at the new curing conditions. In practice, it will be found that after relatively few temperature increments, the rate of cure will have been hastened to a point that a commercial rate of cure will be feasible without having any measurable flow of the coating or loss of orientation with succeeding temperature increments.

The test heretofore described for controlling the critical drying cycle by measuring the average motion of grains away from the top and towards the bottom of a substantially vertical hanging abrasively coated strip is also useful in controlling the critical viscosity of the adhesive used to trap the grains in the coating operation. If the average motion of the grains from the top towards the bottom of the vertically suspended strip exceeds six one hundredths of an inch at the lowest commercially feasible initial curing cycle, the viscosity of the adhesive used to trap the grains must be increased to a point that will decrease the flow at the initial curing cycle to or below six one hundredths of an inch for the first 15 minutes. Furthermore, where any equipment condition wherein the web is brought into a non-horizontal position for an appreciable interval of time between the sand application and the drying chamber exists, the average motion of the grains from the tops towards the bottoms of the suspended loops or other forms of suspended webs must be kept at a rate not to exceed six one hundredths of an inch for any 15 minute interval of time. If the average motion of the grain is greater than six one hundredths of an inch as measured by this test, the viscosity of the adhesive at the time of trapping the grains must be increased to bring the flow down to or below this value, or the viscosity of the adhesive must be rapidly increased immediately after the grains are trapped as for instance by cooling or by solvent removal.

As one form of the present invention, the process includes dispersion with orientation by means of an electrical field as described in the patents to Elmer C. Schacht, No. 2,027,307 and 2,027,309, January 7, 1936. A preferred form of using the process of electrical dispersion comprises an operation wherein the adhesively coated backing with the adhesive face downward is disposed above a belt carrying the abrasive grains and the two are passed simultaneously and in close proximity between electrodes constituting a magnetic or electrostatic field, preferably an electrostatic field. The effect of the field is to raise the grains against gravity and space them approximately equi-distant from each other with their long axes substantially perpendicular to the backing.

This orientation for many uses gives the most efficient performance in the final abrasive product. Orientation methods of coating fail in so far as the favorable orientation brought about, for example, by the field, electrostatic or magnetic, is not maintained and it is a feature of this invention to preserve this favorable orientation while at the same time securing maximum bonding between the adhesive and the abrasive grains by insuring the thorough wetting of the abrasive grains by the adhesive and by insuring a continuous dense bond and abrasive coating relatively free from air pockets, bubbles and the like.

It is to be understood that various elevated temperatures may be used as an aid in applying the various adhesives to the reinforcing backing and that in many cases solvents may be used, depending upon the conditions of operation and the particular type of adhesive body being used, as well as upon the grit size that will be coated. After the adhesive has been applied to the reinforcing backing and before carrying out the treating or pre-treating operation, the average viscosity of the adhesive film may be changed as for instance by the loss of solvent, by drop in temperature and, when in a reactive form, by chemical action as for instance, the further condensation of a resinous adhesive. There may be wide variations in the temperature, humidity and other conditions to which the film is exposed and there may be wide variations in the distance between application of the adhesive coat to the reinforcing backing and the treating or pre-treating step so long as the combination of variables selected gives the desired result that is, so long as a highly viscous adhesive film is delivered to the pre-treating operation it being understood that the change in the film will not be carried to a point that the pre-treating operation will not be effective as for instance the irreversible solidification of the adhesive by chemical reaction or by loss of solvent.

On the other hand the time between pre-treatment of the film and application of the abrasive grains while variable within certain limits, is usually relatively short. The greater the thickness of the resinous film and the greater the viscosity of the resinous film, irrespective of its thickness, the greater will be the time required for producing an effective treatment as for instance softening of a small but definite fraction of thickness of the adhesive film at the surface. It should, however, be appreciated that in any case the treatment results essentially in a stratification whereby the outer surface of the adhesive generally becomes more adhesive and becomes of lower viscosity than the main body of the adhesive. This purpose will not be attained if the time interval between treatment or pre-treatment and grit application is too long or too short. The time interval and other conditions between treatment or pre-treatment and grit application may be varied within limits according to what it is desired to accomplish as for instance, if it is the primary object to pre-wet the grains and soften a small increment of thickness of the adhesive at the surface, the time interval will be shorter than if it is desired to soften a greater increment of thickness at the surface of the adhesive as for instance where very coarse grits are being coated and a relatively thick film of adhesive is required.

In order that the invention may be more clearly understood, reference is made to the accompanying drawings in connection with which representative processes will be described in detail.

In the drawings:

Figure 1 is a diagrammatic view of one form of my invention showing a gravity electrostatic method of sand dispersion but it is to be understood that counter-gravity methods may be used with equal facility.

Figure 2 is a diagrammatic view illustrating the manner in which another form of the invention is carried out, the coated web being continuously or intermittently passed from the sand dispersion step, for example, that of Figure 1 to the coating instrumentalities of the present figure, it being understood that during such travel the web may cool or be positively cooled, and preferably is subjected to partial or complete curing of the making coat of adhesive.

Figure 3 is a top view of the spraying nozzles used in the method illustrated in Figure 1 wherein a solvent, a thin form of resin or a solution of resin or other adhesive is used to pre-treat the adhesively coated web prior to grit application.

Figure 4 is a further form of the invention in which electrostatic dispersion may be employed or any other type of dispersion.

Figure 5 is a top view of a strip of coated abrasive prepared in accordance with this invention, and Figure 6 is a sectional view of a coated abrasive made in accordance with this invention by any dispersion or orientation process and preferably by an electrostatic dispersion method as described in the aforesaid Schacht patents, wherein orientation of the grits is obtained.

Referring to Figure 1, I have shown a making machine illustrating one method of carrying out the invention. The numeral 9 denotes a roll of paper, cloth or other backing which is led over idler roll 10 to a glue trough 11 containing a viscous adhesive 12. The web passes between coating rolls 13 working in the trough 11 which are used to apply the viscous adhesive coat to the reinforcing backing 9. Conventional spray nozzles 14 fed from a manifold 14' best shown in Figure 3, are used for applying the thin film of solvent or a suitable fluid form of adhesive which is a solvent or softening agent for the viscous coating 12 to the coated layer of viscous adhesive which has been applied to the moving backing by the coating rolls 13. The numeral 16 indicates a conventional hopper for the grip or sand 17 which is regularly fed from the hopper by the sand-feeding mechanism 18 while an electrostatic bar 19 is used if desired to disperse the sand as in the aforesaid Schacht patents. The numeral 20 indicates idler rolls over which the abrasively coated web is carried to a suitable drying room.

*Coated abrasive Example I*

The practice of one form of the present invention will now be described as carried out on the apparatus shown in Figures 1 and 3.

While the viscosity and nature of the adhesive will vary with the product that it is desired to make, a viscous adhesive satisfactory for alundum grain, size 100, may be prepared according to resin Example IV and contains a solids content of about 75% and a solvent content (as for example, alcohol) of about 25%. The adhesive is brought to a temperature of about 125° F. either in a glue kettle or on its way from a glue kettle such as is used in the sandpaper industry, to a small glue trough 11 in Figure 1, where it is applied to the paper or other backing 9 by coating rolls 13.

The distance between coating rolls 13 and the treatment spray of adhesive 15 beneath nozzles 14 will vary with the speed of the machine and the temperature of the surrounding atmosphere, and in some cases with the relative humidity, but the use of the relatively volatile solvent (alcohol) which escapes readily from the resinous solution insures a rapid increase in the viscosity of the resinous adhesive between the coating rolls 13 and the treating spray 15. I now adjust the speed of my machine and the surrounding conditions of temperature and humidity so that a full compact layer of abrasive grains 17 will not be picked up and held by the film of adhesive 12 on the reinforcing backing. I mean that I deliver a resinous film beneath sand hopper 16 which is so viscous that it will not pick up a full close coat of abrasive grains when the abrasive grains are applied as illustrated in Figure 1. The meaning of the term "close coat" is well understood in the coated abrasive art and is explained in detail in the said copending application. Preferably I operate with a film which is so viscous that it will not pick up more than about three-fourths of the grains required for a full close coat, thus insuring the advantages of a highly viscous resin hereinbefore explained. It will be appreciated that the steps of adjusting the viscosity as just explained are a convenient means of controlling and setting the viscosity without the necessity of other means of testing the viscosity of the resinous adhesive. During this preliminary testing, no pre-treating step is employed. Having now adjusted and brought about constant conditions wherein the desired viscosity of the resinous film without pre-treatment is attained, I now apply through nozzles 14 a relatively thin spray of a suitable solvent such as alcohol or furfural whereby there is a softening of the surface of the viscous adhesive immediately before the grains 17 are dropped onto the adhesively coated and treated web as hereinbefore explained.

It will be appreciated that while the average viscosity of the resinous adhesive film is very high, there has been a temporary softening of the top surface of the adhesive layer to prepare it for reception of and adhesive retention of the abrasive grains. Immediately after embedding of the grits there will be a further loss of the volatile solvent (alcohol) and there will furthermore be an increase in the viscosity of the outer surface of the adhesive due both to loss of the pre-treating solvent (alcohol) and to some diffusion of the residual solvent into the main body of the adhesive in such a way as to render effective the high average viscosity of the adhesive in supporting the grains in their initially applied positions, while at the same time insuring the picking up of a full close coat of abrasive grains if such is desired and their thorough wetting and bonding by the adhesive.

While the manufacture of a close coat of abrasive has been used by way of illustration, it should be understood that the method is also applicable to open coats, the viscosity required for supporting grains in open coatings being as great or greater than that required for supporting the same grit sizes where a close coating is made. In case it is desired to make an open coating, the viscosity of the resinous adhesive is adjusted to a point as great as or greater than that required for close coats and the desired open coating or thin spacing of grits is obtained by restricting the rate of flow of the abrasive grains from the sand-feeding hopper 16.

From the idler rolls 20 the abrasively coated web is delivered by the usual means to a sandpaper drying room, provided with means for festooning the web and heating or cooling the room. A suitable drying cycle, in the case just given by way of illustration, is one-half hour or more at room temperatures, namely, about 75° F.; then 18 hours at 160° F. followed by heating of about one-half hour at 140° C. The step of heating to a relatively high temperature such as 140° C. subsequent to curing the making coat of adhesive at lower temperatures and prior to application of the sand sizing adhesive is designated as intermediate heating. The coated web may then be removed from the drying room and taken down in the form of rolls and placed on a bundle stand of a suitable sandpaper sizer and given a sand sizing treatment with sizing resin which may be prepared from Resin Example IV by diluting to a solids content of about 50% with ethyl alcohol. This sizing coat may be satisfactorily applied at a temperature of around 70 to 80° F.

After the sizing operation the coated web may again be delivered to a sandpaper drying room and festooned. A satisfactory drying cycle for this particular product after the sizing operation is 1 hour at room temperature, about 75° F.; 18 hours at 160° F. and 1¾ hours at 140° C. The manufacturing operation is now completed and the abrasive coated and sand sized web may be taken from the racks and cut into the shapes desired for use.

Many variations may be made in the process as given by way of illustration, as for instance, in the pre-wetting step I may use a thin solution, 5 to 20%, of resin dissolved in alcohol in lieu of alcohol. Sometimes, especially where coarser grits are being coated, I may use in lieu of a solvent such as alcohol or furfural or a solution of resin in a solvent, a thin form of resin prepared as hereinbefore explained.

Coated abrasive Example II

As a further illustration of the invention, I will now describe the manufacture of grit #80 aluminous oxide abrasive paper, since this type of paper finds wide use in the coated abrasive field. In this case, I may use the type of resinous adhesive given by way of illustration in coated abrasive Example I but I also use and will describe by way of illustration, a coating resin consisting of 50% resin prepared according to Resin Example I and 50% prepared according to Resin Example II. It will be noted that this resin is of a solvent-free type. The application of this resin to the reinforcing backing may be carried out as illustrated in Figure 1, the resin used in this case, preferably being coated at a temperature of 150–160° F. In the present instance, the increase in viscosity before treatment, pre-treatment or coating with abrasive grains will be primarily brought about by a drop in temperature or a loss of water from the resin, the loss of water from resin of this type being associated with an increase in viscosity. Generally the distance between coating rolls 13 and treating spray 15 will be greater than in the case of Coated abrasive Example I and the viscosity may be further increased if desired between coating rolls 13 and treating spray 15 by heating so as to further condense the resin. The correct viscosity for coating is adjusted as explained in Coated abrasive I, and the pre-treating spray is then turned on as in the former case, similar treating agents being applicable in the present instance. When the pre-treating fluid has been turned on and properly adjusted, the abrasive grains are delivered from hopper 16 and applied to the adhesively coated web as described in the former case or by other suitable means.

The abrasively coated web is then delivered to a sandpaper drying room and the product is subjected to a critical drying cycle. Since the cure of the resin is less advanced in the present case than in the case of Coated abrasive Example I, the curing conditions will be different. After a short period (about ½ hour), at about 75° F. to remove most of the alcohol or other volatile solvent used in the pre-treating step, the temperature is increased to and held at about 115° F. for 2 hours. The temperature is then raised to and held at 125° F. for 2 hours; the temperature is then raised to and held at 135° F. for 3 hours. The temperature is then raised to and held at 145° F. for a period of 6 hours; it is then raised to and held at 160° F. for 6 hours, followed by a heating at 180° F. for 2 hours and a final heating at 140° C. for one-half hour. The coated web may then be removed from the drying room and sized as hereinbefore explained or according to one of the special methods hereafter described.

Another process and apparatus for treating or pre-treating viscous adhesives to prepare the surface of the adhesive for the reception of the abrasive grains will be described in connection with Figure 4.

Referring to Figure 4, the numeral 9 represents a suitable backing such as paper, cloth, combination and the like, which is passed over idler rolls 10 to a conventional coated abrasive adhesive trough 11 containing a viscous resinous adhesive 12, and between conventional sandpaper coating rolls 13, working in said trough. The numeral 27 represents a suitable sandpaper adhesive heating apparatus from which extends a delivery tube 28, carrying the adhesive to the trough 11, said tube having a valve 29 for the control of the flow of the adhesive. The numeral 16 represents a conventional sand hopper containing the abrasive grains 17 and the numeral 18 indicates a feed roller and gate for controlling the flow of the grits. The numeral 30 represents conventional nip rolls for pressing the abrasive into the adhesive, while the numeral 31 represents a sand drum for further rolling in the abrasive grits. A conventional rattler 32 receives the web from the sand drum 31 and the web is drawn through the machine by means of a conventional suction drum 33. At 34 I have shown a source of radiant heat which may be in the form of a large inverted hot plate radiating its heat downward and constituting the treating or pre-treating means for preparing the surface of the viscous adhesive to receive the grits. This source of radiant heat may be heated by any conventional arrangement of electrical coils, strip heaters, and the like as is well known in the art, to produce a heated plate of metal above the adhesively coated side of the web 9 as it passes under the heating means 34 just prior to the abrasive grain application.

Coated abrasive Example III

As a further illustration of this form of the invention, I will describe a suitable process for #24 aluminous oxide. A fabric backing may be selected from various types of paper, properly treated cloth and combinations of cloth and paper or of cloth and vulcanized fibre. For the manufacture of #24 fibre backed discs with a resinous binder, a preferred backing is described in the copending application of Oglesby, Reilly and Gilbert, Serial No. 124,506, filed Feb. 6, 1937.

The preferred backing consists of one lamina of vulcanized fibre of about 10 mills in thickness and weighing about 200 lbs. per paper ream to which is adhesively united a de-sized drill's cloth under conditions which prevent blisters and separations of the lamina. A suitable adhesive for the laminating operation is resin Example I or resin Example I thinned with resin Example II. After laminating the web is preferably partially cured to a highly adhesive but relatively flexible condition.

Vulcanized fibre is a term applied to a hard, horny paper-like material which is generally produced by manufacturing paper from cotton rag stock and then subjecting the rag paper to an action known as vulcanizing which consists of an appropriate treatment with sulphuric acid or more commonly with a solution of zinc chloride, whereby the cellulose is more or less gelatinized but generally without complete disintegration of the individual fibres. After the gelatinizing action, the web is washed thoroughly to remove all traces of sulphuric acid or zinc chloride as the case may be, as the presence of even minute quantities of these materials will result in a rapid deterioration of the product as, for example, loss of strength.

The combination web prepared as described and as given in further detail in the said copending application is removed from the curing racks and is ready for coating. While either side of the web may be coated, we generally prefer to coat the cloth side of the combination.

A suitable adhesive for the coating of grit #24 aluminous oxide is illustrated by resin Example I or by a mixture of resin Example I and resin Example II, but preferably the former. A suitable temperature for coating this viscous adhesive is 150-160° F. and the adhesive is brought to this temperature prior to its application to the backing 9 by the coating rolls 13. In this case a suitable coating weight of the viscous adhesive is about 22 lbs. per sandpaper ream. After application of the adhesive to the backing there is an increase in viscosity due to temperature drop but there may also be brought about a still further increase in viscosity as by heating so as to further cure the resinous adhesive before it comes beneath the treating or pre-treating hot plate 34. Prior to turning on the heat for the pre-treating or treating operation, the viscosity of the adhesive on the coated web is adjusted so that a full close coat of abrasive grains will not be picked up, when an excess of abrasive grains are applied from hopper 16 as illustrated in Figure 4. Preferably the viscosity is increased to a point that not over one-half of a full close coat of abrasive grains will be picked up. The heat is then turned on to the source of radiant heat 34 as for instance by means of an electric switch, and the temperature of the hot plate is increased to a point that will soften the top surface of the viscous resinous adhesive and adapt it to receive and hold the desired close coat of abrasive grains, it being understood that the nip rolls 30 and the sand drum 31 will be used as an aid in obtaining the desired sand weight and density of sand packing. It should be appreciated that after the coating of the abrasive grits 16 there will be an immediate increase in the viscosity of the resinous adhesive by virtue of its decrease in temperature, this action being most pronounced at the exposed preheated surface of the adhesive and being aided by the heat capacity of the abrasive grains coated, the abrasive grains being at a lower temperature than the pre-treated surface of the resinous film and therefore capable of absorbing heat therefrom. After the abrasive grains have been coated, as described, the abrasively coated web passes, preferably continuously, to a sandpaper drying room where it may be hung in the form of festoons and cured by the application of a critical drying cycle such as is required to prevent flow of the resinous adhesive or material dislocation of the grits.

In this case, an excess of abrasive grains is applied to the adhesively coated backing and the applied pressure during rolling is against the excess grains. For this reason, a substantial number of the grits will be oriented with their longer axes at an angle of 45 to 90° with the reinforcing backing. Thus, a substantial proportion of the grains have their sharp points or edges free to engage the work. A substantial percentage of the abrasive grains have from ⅓ to ½ or more of their volumes exposed above the average level of the adhesive binder.

A suitable drying cycle in this case is 2 hours at 110° F.; 1¾ hours at 115° F.; 2 hours at 120° F.; 2 hours at 125° F.; and 4 hours at 130° F. The goods should then be cooled to a temperature of around 70-80° F. to render the adhesive less tacky and they are then taken down in jumbo form or other conventional ways, or if desired, the goods may be carried directly to the sizing apparatus and sized. If taken down in the form of rolls, the rolls are returned and mounted on a suitable bundle stand or other means, in front of a conventional coated abrasive sizing machine. The sizing resin is prepared in a conventional coated abrasive adhesive kettle and run to the sizing trough of the sizing machine. A satisfactory adhesive for the sizing operation may be prepared by taking 60 parts by weight of the viscous resin prepared as illustrated in resin Example I and mixing with 40 parts by weight of a less viscous resin, illustrated in resin Example II. A satisfactory temperature for application of sizing adhesive used in this case is 140-150° F. For many applications a satisfactory weight of the sizing material to be applied is 27 lbs. per sandpaper ream. After the sizing coat has been applied, the sand sized web is delivered by the usual means to a sandpaper drying room, festooned and cured under critical conditions to prevent flow of the resin and dislocation of the abrasive grain. In the present case a satisfactory drying cycle within the drying room is as follows,

|  | Hours |
|---|---|
| 105° F | 5 |
| 110° F | 5 |
| 115° F | 4 |
| 120° F | 5 |
| 125° F | 5 |
| 130° F | 10½ |

After this drying cycle has been completed, the goods should be cooled to a temperature of around 95° F. to reduce the tackiness of the adhesive so that the goods can be taken down in the form of rolls.

The goods taken from the sandpaper drying room in the form of rolls or otherwise are then cut into satisfactory lengths of strips for a subsequent curing operation to finally cure the resin and develop its tensile strength, hardness and toughness. The strips are conveniently cured to the final condition by placing them on suitably arranged shelves within a baking oven and subjecting them to a temperature of 70° C. for 8 hours; 80° C. for 8 hours and then gradually raising the temperature to 100° C. so that a temperature of 100° C. is reached within 1 hour; then holding at 100° C. for 1 hour, raising the temperature during the next hour to 120° C. and holding at 120° C. for 1 hour, gradually raising during the next hour to 140° C. and then holding at 140° C. for 1 hour; then gradually raising during the next hour to 150° C. and holding at this temperature for 3½ hours. The heat is then turned off and the strips are allowed to cool after which they may be cut into the desired sizes and shapes.

While operative means and in many cases, very satisfactory means of applying a sand sizing coat have been illustrated in Coated abrasive Examples I, II and III, I sometimes find it advantageous to apply special sizing methods and one phase of this invention comprises a treatment or pre-treatment whereby the exposed surface of the making coat of adhesive and the exposed portions of the abrasive grains are prepared to receive the sand sizing adhesive. This method is conducive to the formation of a continuous dense bond free from void spaces such as air pockets, bubbles and the like and insures thorough wetting of the top surface of the making coat of adhesive and the exposed surfaces of the abrasive grains by the sizing adhesive.

*Special sizing*

Referring to Figure 2, the numeral 9 represents the web previously coated with adhesive and to which the abrasive grains have been applied in accordance with the methods and illustrations herein disclosed, or other methods and the adhesive coating has been partly or wholly cured to such an extent that the grits are held substantially rigid during the operations carried out as illustrated in Figure 2. The treating or wetting agent, for example, a solvent or fluid form of adhesive, or thin solution of adhesive, is held in a tank not shown and may be warmed or not warmed according to its nature, to facilitate the application of a thin coat. This wetting or treating agent 21 is run to a box 22 where it is applied to the abrasively coated web 9 by coating rolls 23. In all cases 10 represents idler rolls whereby the abrasively coated web is carried through the steps of Figure 2.

The adhesive sizing coat is held in a suitable apparatus such as a glue kettle, not shown. The adhesive 24 is run by suitable means to glue trough 25 where it is applied on top of the pre-treated abrasive grains and making coat of adhesive by coating rolls 26 after which the coated web may be carried to a sandpaper drying room and critical drying operations may be carried out as heretofore explained.

The pre-treating solvent, solution, or thin resin will depend upon the size of the grits being coated and the nature of the adhesive used as making and sizing coats. In the case of phenol formaldehyde resins used by way of illustration in Coated abrasive Examples I, II and III, a satisfactory pre-treating solvent is furfural which, however, should be applied as a very thin coat. Also, I may use a very dilute solution of the phenolic resins used by way of illustration, that is, a 5 to 20% solution of the resins dissolved in a suitable solvent as for example, alcohol. Where it is desired to pre-treat the coated web prepared in accordance with Coated abrasive Examples I, II and III with a thin form of a phenol formaldehyde resin, before sand sizing, the thin form of resin prepared in accordance with Resin Example V is satisfactory. After the pre-treating operation, the same sand sizing adhesives as used in Coated abrasive Examples I, II or III, as the case may be, is used or by virtue of the pre-treating operation I may use more viscous sand sizing adhesives and still secure the desired degree of wetting and bonding, with substantial freedom from air bubbles, pockets and the like, whereby a dense and continuous bond is formed by the making and sizing adhesives. After the sizing operation has been completed, the final curing of the resin may be brought about as heretofore described, that is, by the particular conditions prescribed for Coated abrasive Examples I, II and III respectively.

I have further found that sizing coats may sometimes be efficiently added by applying two coats of thinner adhesive to the abrasively coated web prepared and partially cured or cured before the sizing operation, as illustrated in Coated abrasive Examples I, II and III respectively or otherwise prepared for the sizing operation. Where a thinner or less viscous form of adhesive is used, a lighter coat is applied over the grains and being of lower viscosity, the grains are more readily wetted, and since the coating is light even though the viscosity is low, there is no substantial flow of the adhesive or dislocation of the abrasive grains. After this thinner coat of sizing adhesive of lower viscosity has been wholly or partly cured whereby its viscosity and jelly strength have been increased or after its viscosity and jelly strength have been materially increased by loss of solvent or by both curing and loss of solvent, a second sand sizing operation is carried out in which a thin coating of low viscosity sizing solution is added over the first sizing coat, the quantity of coating and viscosity of the coating being adjusted to prevent substantial flow of the adhesive or dislocation of the grains. After this operation, the sand size web is cured under critical conditions to develop the required properties of the adhesive bond, such as tensile strength, hardness and toughness, as heretofore explained. It should be understood that more than two sand sizing operations may, if desired, be carried out in the same way. In other words, instead of applying the sand size in one operation, it may be applied in two or more operations but it will usually be found that two operations will suffice.

The viscosity of the sizing solution where two or more coats of sand size are used instead of one coat is, as stated, lower than where it is desired to add the same amount of sizing adhesive in one operation. The exact viscosity and solids content of the sizing solution used in any case are adjusted with due regard to the grit size being coated, the holding properties of the adhesive used and the intended use of the final coated abrasive. Likewise, adjustment of the viscosity and solids content will vary within limits according to the method of application. It should further be appreciated that the temperature at which the sizing solution is added will vary with these same conditions, variations in temperature often being a convenient means of regulating the coating characteristics of an otherwise desirable sizing adhesive or solution.

A suitable sizing equipment is illustrated in Figure 2, it being understood that only one set of coating rolls is required for application of a single sizing coat. After the first sizing operation, the viscosity of the first sizing coat is increased as before explained and a second sizing coat may then be added by the second set of coating rolls or the web may be returned to the first set of sizing rolls.

It should be understood that the examples of the operations carried out in the apparatus shown in Figures 1, 2, 3 and 4 are by way of illustration and that the same objects may be accomplished by other suitable equipment as for instance—

Referring to Figure 1, many variations in this arrangement for applying the pre-treating fluid will occur to those skilled in the art.

Referring to Figure 2, coating rolls 23 have been shown as a means of applying the treating solvent or solution or thin form of resin. It will be clear that this treatment or pre-treatment may be applied by other means as for instance by suitable spraying equipment. In Figure 2 rolls 26 have been given by way of illustration as one method of applying a sand sizing adhesive, but I may use instead thereof, suitable spraying equipment or other means of dispersing fluids known to the art.

I may also, for example, in the case where intermediate heating, i. e., curing is carried out, and as a further means of pre-treating the abrasively coated web before sand sizing, heat the adhesively held grains, for instance, by a source of radiant heat, before applying the sand sizing.

The present invention is subject to considerable change and modification, without departing from the spirit of the invention, and the invention may take various forms, all of which are considered to be comprehended within the scope of the appended claims.

I claim:

1. In the manufacture of coated abrasives, applying a viscous resinous material to a backing, applying a thin film selected from a group consisting of solvents, thinner forms of resins and resin solutions to the outside surface of the viscous resinous coating and softening the same to produce a zone in the coating which is more fluid than the main body of the coating and the adhesive adjacent the backing, and then applying abrasive grains to the modified resinous layer before the film has time to uniformly mingle with the viscous resinous material, whereby the abrasive grains are wetted by the thin film and sink into the more viscous underlying resinous material which holds them substantially in their initially applied positions.

2. In the manufacture of coated abrasives, applying a viscous adhesive to a backing, applying a thin film of a more fluid material selected from a group consisting of solvents, thin adhesives and adhesive solutions to the outside surface of the viscous adhesive coating and softening the same to produce a zone in the coating which is more fluid than the main body of the coating and the adhesive adjacent the backing, and then applying abrasive grains to the film and adhesive layer before the film has time to uniformly mingle with the viscous adhesive, whereby the abrasive grains are wetted by the thin film and sink into the more viscous underlying material which holds them substantially in their initially applied positions.

3. The method of making coated abrasives comprising forming on a backing a highly viscous synthetic resin adhesive layer, heating the surface of the adhesive and softening the same to produce a zone in the coating which is more fluid than the main body of the coating and the adhesive adjacent the backing whereby it is capable of trapping and embedding the desired grit weight, without correspondingly reducing the viscosity of the adhesive layer adjacent the backing, and while the adhesive layer is in such a state, applying a layer of grit thereto, whereby the grits are wetted by the more fluid surface zone and pass into the more viscous underlying synthetic resin adhesive layer which maintains them in substantially their initially applied positions.

4. The method of sizing a coated abrasive comprising applying to the grit and making coat, a layer of a wetting agent which is a softener for the making coat and a thinner for the size, and thereafter applying a sizing coat.

5. The method of sizing a coated abrasive comprising applying to the grit and making coat a layer of sizing of low viscosity, and thereafter applying a sizing coat of relatively higher viscosity.

6. The method of sizing a coated abrasive having a making coat of an incompletely cured synthetic resin comprising applying a wetting agent to the making coat and grit, and thereafter applying a sizing coat to the making coat and grit, the making coat being resistant to any substantial softening or solvent action by said wetting agent and sizing whereby the grains are maintained free of movement within the making coat.

7. The method of sizing a coated abrasive comprising applying to the grit and making coat a layer of a wetting agent which is miscible with the sizing adhesive and thereafter applying the adhesive sizing coat.

8. The method of sizing a coated abrasive having a synthetic resin making coat comprising applying to the grit and making coat, a layer of a wetting agent which is miscible with a sizing of an incompletely cured synthetic resin and which is selected from the group consisting of thin resins, solvents and resin solutions, applying such a sizing coat and further curing the sizing.

9. The method of sizing a coated abrasive having a synthetic resin making coat cured to a state where it is substantially non-softening and insoluble in the presence of a resin solvent and resin sizing, comprising applying to the grit and making coat, a layer of wetting agent which is miscible with an incompletely cured synthetic resin sizing and which is selected from the group consisting of thin resins, solvents and resin solutions, applying such a resin sizing coat, and further curing the sizing coat.

10. The method of making coated abrasives including a backing comprising forming an adhesive coating on the backing which is too viscous to properly wet and pick up the desired grit weight, and softening the adhesive to produce a surface zone in the coating which is more fluid than the main body of the coating and the adhesive adjacent the backing, so that the desired grit weight may be thoroughly wetted and trapped by the more fluid surface zone and sink into the more viscous zone of the adhesives, whereby the grits are held substantially in their initially applied positions, and applying a layer of grit to said adhesive coating while the said adhesive is in this condition.

11. The method of making coated abrasives including a backing comprising forming an adhesive coating of synthetic resin on the backing which is too viscous to properly wet and pick up the desired grit weight, and softening the adhesive to produce a surface zone in the coating which is more fluid than the main body of the coating and the adhesive adjacent the backing, so that the desired grit weight may be thoroughly wetted and trapped by the more fluid surface zone and sink into the more viscous zone of the adhesive, whereby the grits are held substantially in their initially applied positions, and applying a layer of grit to said resinous adhesive coating while the said adhesive is in this condition.

12. The method of making coated abrasives including a backing comprising forming a viscous adhesive layer on the backing, applying a liquid pre-wetting layer to the surface of the viscous adhesive, said liquid pre-wetting layer having a viscosity substantially lower than the viscosity of said viscous adhesive layer and being selected from a group of materials consisting of solvents, thin adhesives, and adhesive solutions, whereby the abrasive grains are pre-wetted in their passage through said pre-wetting layer into the viscous underlying adhesive, said viscous underlying adhesive serving to retain the grits in their initially applied positions, and applying a layer of grit to said adhesive layer while the latter is covered with said pre-wetting layer.

13. The method of making coated abrasives including a backing having a synthetic resinous binder coated thereon, comprising forming a viscous layer of a synthetic resinous adhesive on a backing, dispersing abrasive grains from an abrasive grain-supplying means, and after the grains are dispersed to deliver them to the adhesively coated surface of the backing in a uniformly dispersed condition, pre-wetting the abrasive grains with a liquid which is a softening agent for said viscous layer and which is less viscous than the synthetic resinous binder whereby the abrasive grains are more readily embedded in and held by the more viscous synthetic resinous binder, adhering the grains to the backing with the synthetic resinous binder and subsequently curing the binder under such conditions as will maintain the abrasive grains in substantially their initially anchored positions.

14. In the manufacture of coated abrasives, the steps comprising coating a reinforcing backing with a viscous resinous adhesive, applying abrasive grains to the viscous resinous adhesive, heating to harden the resinous adhesive, wetting the surfaces of the grains not covered with the bottom coat of adhesive with a liquid wetting agent of relatively low viscosity and selected from the group consisting of resin solvents, resin solutions and thinner forms of resinous adhesives whereby the said liquid used to wet the surface of the grains sinks into the crevices of the grains and into the void spaces between the grains adjacent the said hardened resinous adhesive, displacing the air from such crevices and voids and serving to bring about a complete union between the grains, and a subsequently applied sizing coat of liquid resinous adhesive, and also serving to bring about a complete union of the said sizing coat and the said hardened resinous adhesive, and then applying a sizing coat of liquid resinous adhesive and heating to harden the adhesives.

15. The method of making coated abrasives comprising forming on a backing a highly viscous resinous adhesive layer, softening the adhesive to create a wetting surface zone which is more fluid than the main body of the coating and the adhesive adjacent the backing, applying a layer of grit thereto, at least partially curing said adhesive, heating the abrasive grits and surface of the at least partially cured said adhesive whereby the penetration of the subsequently applied sizing coat into the crevices in the grains and into the voids between the grains adjacent the said at least partially cured adhesive is facilitated, and applying thereto while in a heated condition, a sizing coat of resinous adhesive.

16. The method of making coated abrasives comprising forming on a backing a viscous resinous adhesive layer of a character to trap and hold abrasive grains, applying a layer of grit thereto, at least partially curing said adhesive, heating the abrasive grits and surface of the at least partially cured said adhesive whereby the penetration of the subsequently applied sizing coat into the crevices in the grains and into the voids between the grains adjacent the said at least partially cured adhesive is facilitated, and applying thereto while in a heated condition, a sizing coat of resinous adhesive.

17. A method in accordance with claim 10 characterized in that a pre-wetting layer is formed on the coated abrasive and a sizing coat is then applied on said pre-wetting layer.

NICHOLAS E. OGLESBY.